F. H. HALL.
SAW FILING MACHINE.
APPLICATION FILED JUNE 28, 1915.
1,269,705.
Patented June 18, 1918.
2 SHEETS—SHEET 2.
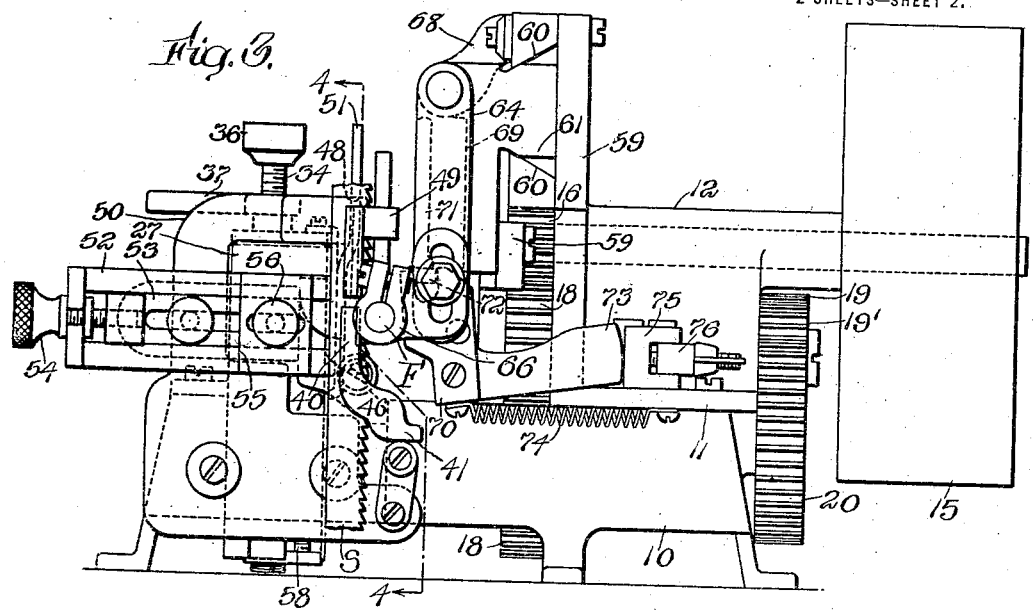
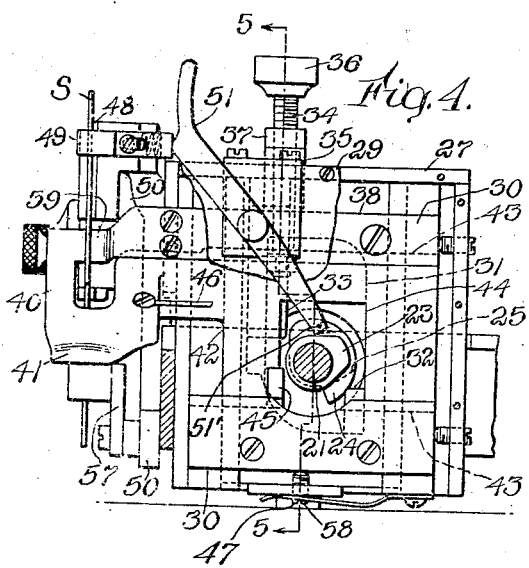
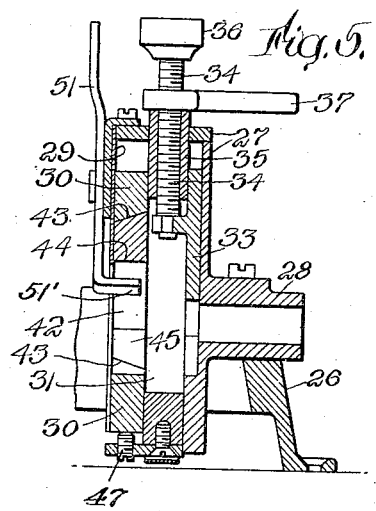
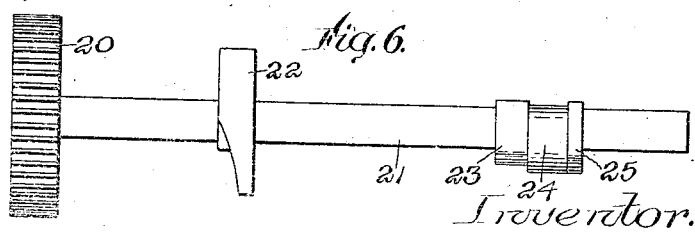
Inventor:
Frank H. Hall.
By Henry J. Miller
atty.

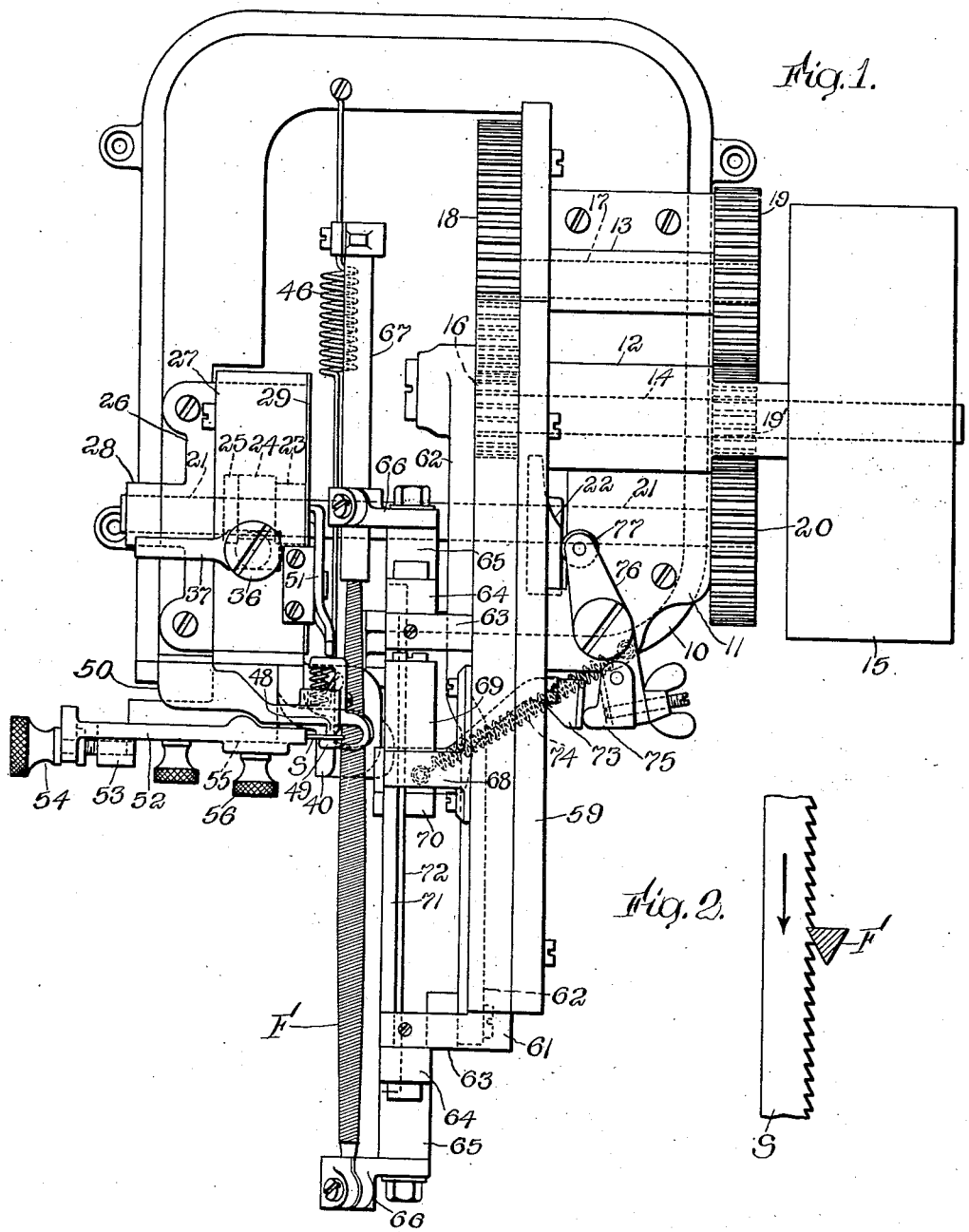

UNITED STATES PATENT OFFICE.

FRANK H. HALL, OF BOSTON, MASSACHUSETTS.

SAW-FILING MACHINE.

1,269,705.     Specification of Letters Patent.     Patented June 18, 1918.

Application filed June 28, 1915. Serial No. 36,692.

*To all whom it may concern:*

Be it known that I, FRANK H. HALL, a citizen of the United States, residing at Boston, in the county of Suffolk and State of Massachusetts, have invented certain new and useful Improvements in Saw-Filing Machines, of which the following is a specification, reference being had to the accompanying drawings, forming part thereof.

This invention has reference to improvements in machines for filing saws and has for one of its primary objects to so intermittently move the saw under operation that if a bur is raised at the point of a saw tooth such bur is removed by the operation of the file on the next succeeding saw tooth.

Another object of this invention is to mechanically move the saw intermittently to meet the file.

Another object of the invention is to provide means to automatically grip the saw to hold the same during a filing operation, to automatically grip the saw at a point distant from such holding point and to automatically release the first mentioned gripper and to move the second gripper a predetermined distance.

Still another object of the invention is to improve the mechanism for adjusting and holding the saw.

Other objects of the invention will appear from the following description.

The invention consists in means to mechanically move a saw intermittently to meet the file and in means for sustaining and operating the file.

The invention also consists in the saw gripping and advancing means and in the mechanism for operating the same.

The invention also consists in such other novel features of construction and combination of parts as shall hereinafter be more fully described and pointed out in the claims.

Figure 1, represents a plan view of the improved saw filing machine.

Fig. 2, represents a diagrammatical view of a saw and a file to illustrate the direction in which the saw is moved to meet the file.

Fig. 3, represents an end view of the improved machine.

Fig. 4, represents a sectional view of parts of the machine as taken on line 4—4 Fig. 3.

Fig. 5, represents a similar view taken on line 5—5 Fig. 4.

Fig. 6, represents an enlarged view in elevation of the cam shaft and its gear.

Similar characters of reference designate corresponding parts throughout.

As shown in the drawings in its preferred form the main frame 10 has the top plate 11 furnished with the bearings 12 and 13 respectively for the main shaft 14 which has the driving pulley 15 and the pinion 16, and for the intermediate shaft 17 having the gear 18, driven from pinion 16, and the pinion 19 which operates the idle pinion 19' and thus drives the gear 20 of the cam shaft 21. This cam shaft 21 is journaled in bearings of the main frame 10 and has the saw carriage actuating cam 22, the release and holding cam 23, the depressing cam 24 and the lifting cam 25.

On the main frame 10 is mounted the bracket 26 having the frame 27 having the bearing 28, to receive one end of cam shaft 21, and the plate 29. This frame 27 constitutes a vertical guide for the member 30 which latter has the opening 31 and the bearing shoulder 32 is slidable and is provided with the adjustable finger 33, independently slidable on or in said member 30, against which the lifter cam 25 is adapted to act. This finger 33 is adapted to be adjusted by means of its screw 34 operating in the screw threaded sleeve 35 of member 30 which is slidable through an opening in the top of frame 27. Rotation of screw 34 is effected by its thumb nut 36 and such screw is locked in the adjusted position by the lock nut 37 acting against the end of sleeve 35.

Fixed on the member 30 is the plate 38 of the jaw 39 which extends outward at one end of frame 27. Complemental to said jaw 39 is the jaw 40 having the bearing extension 41, see Fig. 3, and preferably forms part of the slide 42 which is slidable laterally in guides 43, 43 of member 30 and has the opening 44 furnished with the shoulder 45, related to the release cam 23. As will hereafter be more fully described cam 23 acts at times against said shoulder 45 to move slide 42 and its jaw in the release direction from jaw 39 against the retractive action of spring 46 which is attached to slide 42 and to a fixed part of the machine, the retractive movement of slide 42 being limited by the screws 47, 47 adjustably mounted in a member of the frame 27.

Mounted on the frame 27 above the jaws 39 and 40 is a saw gripping and holding means constituted by the fixed jaw 48 and the spring closed slidable jaw 49 both sustained by the plate member 50 which is mounted at this end of the frame 27. Spring closed jaw 49 is adapted to be actuated in the release direction by the lever 51 pivotally mounted on a stud of frame plate 29 and having the bent end 51' acted on by the release cam 23 whereby during the rotation of shaft 21 said cam 23 acts first to swing said lever 51 to move jaw 49 away from jaw 48, to hold said jaw 49 in the open position while the saw S, under operation, is being advanced the length of a tooth by the downward movement of jaws 39 and 40 and their member 30 and slide 42.

On the plate member 50 is mounted the guide 52 having the slidable member 53 adjustable by means of the screw 54 and carrying the slidable guide member 55 adapted to be secured in position to bear against the back of saw S by means of the clamping nut 56. After such quick slide adjustment of guide member 55 on the slidable member 53 the latter may be carefully adjusted by means of said screw 54.

On the lower portion of a member of plate 50 is mounted the stop 57 which is adapted to limit the downward movement of the extension 41 of jaw 40 but this stop 51 may be dispensed with when the yielding stop 58 for the member 30 is used.

Mounted on the plate 11 of the main frame 10 and extending transversely of cam shaft 21 is the standard frame 59 having the longitudinal guides 60, 60 for the file carriage 61 which derives a reciprocating movement from the connecting rod 62 pivotally mounted on studs respectively of said carriage 61 and of the gear 18. Carriage 61 has the arms 63, 63 from which depend the pivoted arms 64, 64 having at their lower ends the extensions 65, 65 to which the file carrying members 66, 66 are adjustably secured. One of these file carrying members 66 preferably is provided with the adjustable extension rod 67 between the end of which and the other of said members 66 the file F, of suitable cross sectional shape, is so sustained that two faces of the file may act simultaneously against two adjacent portions, the front and the back, of saw teeth under operation.

Carriage 61 has also the fixed arm 68 from which depends the pivoted arm 69 having the slotted member 70 which receives the lower edge portion of plate 71 having the edge 72 which plate extends between the arms 64, 64. This member 70 has the arm 73 and the retracting spring 74 against the action of which arm 73 is moved by the adjustable bearing member 75 of the lever 76 which lever is pivotally mounted in the machine and has the follower 77 bearing against and following the face of cam 22.

With saw S adjusted as above described by means of the parts 53, 55 and 56 and sustained in the position shown in the drawings by means of the saw clamp members 48, 49 and with the file F in position as shown in Fig. 1, the rotation of shaft 14 will be transmitted by pinion 16 to gear 18 which effects the drawing of file carriage 61 by means of connecting rod 62 in a direction whereby the file will act on the back of one of the saw teeth and on the front edge of the saw tooth next above as is shown in Fig. 2. As the file carriage 61 reaches the limit of its movement in the filing direction the cut-away or clearance of cam 22 will permit the relieving movement of follower 77 under the retractive effect of spring 74 thus permitting this spring 74 to act to swing the file carriage and its file F away from the saw S for the return movement of this carriage.

After such operating or filing motion of the file carriage 61 cam 24 of shaft 21 will act against shoulder 45 of jaw member 42 to move said member and its jaw 40 in the release direction against the action of spring 46 while cam 25, of said shaft 21, will act against the slide 33 to move upward said slide and its member 30, carrying with it the slide member 42 and the jaws 39 and 40 a predetermined distance, usually the space of one of the teeth of the saw S. Approximately as the upper limit of movement of jaws 39 and 40 is reached cam 24 passes shoulder 45 and permits the retraction of jaw or slide member 42 by spring 46 to clamp the saw S between these jaws. At this time cam 23 acts against lever 51 to effect the release movement of spring actuated jaw 49 and to hold said jaw in the release position while cam 23 is acting against shoulder 32 of member 30 to move downward said member 30 and, with it, the jaws 39 and 40 with the saw S clamped therebetween thus to present the next succeeding tooth of the saw to the operation of the file F in the next operative movement of the file carriage in which the file acting against the back of the newly presented saw tooth will remove the bur raised on the point of the tooth by the filing operation on the saw tooth next below.

While I have shown herein a preferred construction of my improved saw filing apparatus it is not my intention thereby to limit my invention except as hereinafter claimed.

Having thus described my invention I claim as new and desire to secure by Letters Patent—

1. A saw filing machine comprising two saw clamping devices, means for moving one of said devices relative to the other of said devices, and means for opening one of said devices during such movement.

2. A saw filing machine comprising two saw clamping devices one of which is movably mounted, means for moving said movable device, and means for alternately opening said devices.

3. A saw filing machine comprising two spring closed saw clamping devices one of which is movably mounted, means for moving said movable device, and means for alternately opening said devices against the action of their springs.

4. A saw filing machine comprising two spring closed saw clamping devices one of which is movably mounted, means for moving said movable device toward and from the other of said devices, means for opening said movable device prior to its forward movement and for permitting the closing of said device, and means for opening the fixed device approximately at the return movement of said movable device.

5. A saw filing machine comprising a fixed saw clamp having a spring actuated jaw, a pivoted lever for operating said jaw, a vertical guide, a member mounted to move in said guide and having a fixed jaw, a spring closed jaw slidably mounted on said latter member, and cams for operating said lever, said member and said slidable jaw.

6. A saw filing machine comprising a fixed saw clamp having a spring actuated jaw, a pivoted lever for operating said jaw, a vertical guide, a member mounted to move in said guide and having an opening and a fixed jaw, a spring closed jaw having an extension slidably mounted on said member, an elevating and depressing cam operating in the opening of said member, an actuating cam operating in the opening of said jaw extension, and a cam for actuating and holding said lever in the jaw releasing direction.

7. A saw filing machine comprising means for intermittently feeding forward a saw, a guide spaced from and extending transversely of the path of the saw, a member slidable in said guide, a file carrier pivotally mounted on said member, means for effecting reciprocation of said member, a rotary cam, and mechanism operated by said cam for effecting the swinging of said file carrier in one direction.

8. A saw filing machine comprising means for intermittently feeding forward a saw, operating means therefor having a rotary shaft having a cam, a train of gears for operating said shaft, a file carriage slidably mounted and connected by a rod with one of said gears, a file carrier pivotally mounted on said carriage, and mechanism actuated by said cam for effecting the swinging movement of said file carrier.

9. A saw filing machine comprising means for intermittently feeding forward a saw, a standard spaced from the path of said saw and having a guide, a member slidable in said guide and having pivoted arms, a file carrier mounted at the lower ends of said arms, a rotary shaft having a cam, an arm engaged with a member of said file carrier, a spring acting to retract said arm and said carrier, and a pivoted lever having a follower bearing against said cam and an adjusting device acting against said arm.

10. A saw filing machine comprising a vertical guide, a member slidable in said guide and having a fixed jaw, a movable spring closed jaw and an adjustable bearing, and cams operating respectively against said bearing and against a member of said movable jaw.

11. A saw filing machine comprising a guide frame having a vertical guide, a member slidable in said guide and having a fixed jaw, an adjusting screw mounted in said member and having a slidable bearing, a cam operating against said bearing to move said member vertically, a spring closed jaw having an element slidable laterally on said member, adjustable means on said frame for limiting the closing movement of said jaw element, and a cam for operating said jaw element against the action of its spring.

12. A saw filing machine comprising two saw clamps spaced vertically and each having a fixed jaw and spring closed jaw, one of said clamps movable relative to the other, means for intermittently operating said movable clamp, means for alternately operating the spring closed jaws of said clamps, and a saw guide having an adjustable member to bear against a saw extending between said clamps.

13. A saw filing machine comprising two saw clamps spaced vertically and having releasable jaws, one of said clamps movable relative to the other, means for intermittently moving said movable clamp to effect the feeding of a saw, means to operate said releasable jaws alternately, a saw guide adjustable toward and from the path of the saw at one side, a file, and mechanism for carrying and operating said file at the other side, relative to said guide, of the path of the saw.

FRANK H. HALL.

Copies of this patent may be obtained for five cents each, by addressing the "Commissioner of Patents, Washington, D. C."